United States Patent [19]

Gouldey et al.

[11] Patent Number: 4,775,100
[45] Date of Patent: Oct. 4, 1988

[54] LINE VOLTAGE SETBACK THERMOSTAT

[75] Inventors: Glenn C. Gouldey, Beaverton; Eugene M. Shanahan, Hillsboro; Robert E. Smith, Wilsonville, all of Oreg.

[73] Assignee: Eaton Corporation, Cleveland, Ohio

[21] Appl. No.: 33,965

[22] Filed: Apr. 1, 1987

[51] Int. Cl.⁴ .............................................. F23N 5/20
[52] U.S. Cl. ................................ 236/46 R; 236/68 B; 337/377
[58] Field of Search ..................... 236/46 R, 47, 68 B; 165/12; 337/377, 301, 303

[56] References Cited

U.S. PATENT DOCUMENTS

| | | | |
|---|---|---|---|
| 2,461,904 | 2/1949 | Vaughan | 236/68 B |
| 3,581,985 | 6/1971 | Thorsteinsson | 236/68 B |
| 3,834,618 | 9/1974 | Buckwalter | 337/377 X |
| 4,587,403 | 5/1980 | Shapess | 236/68 B |

Primary Examiner—William E. Wayner
Attorney, Agent, or Firm—R. A. Johnston

[57] ABSTRACT

A line voltage setback thermostat retrofitable over existing single width electrical wall outlet boxes. A metal deck plate is attached to the box and extends laterally beyond along the wall. The line load switch is mounted to the deck plate back and extends into the box and is covered with a metal cover. A resistor under the metal cover provides heat for setback mode operation of a bi-metal element which operates the load switch. A timer for energizing the resistor and surface wiring are surface mounted on the extended portion of the deck. A plastic cover is attached to the deck plate from the back and covers the timer and surface wiring and also retains the metal switch cover. An outer bezel with adjustment knobs extending therethrough provides indicia for setting the thermostat and timer.

7 Claims, 3 Drawing Sheets

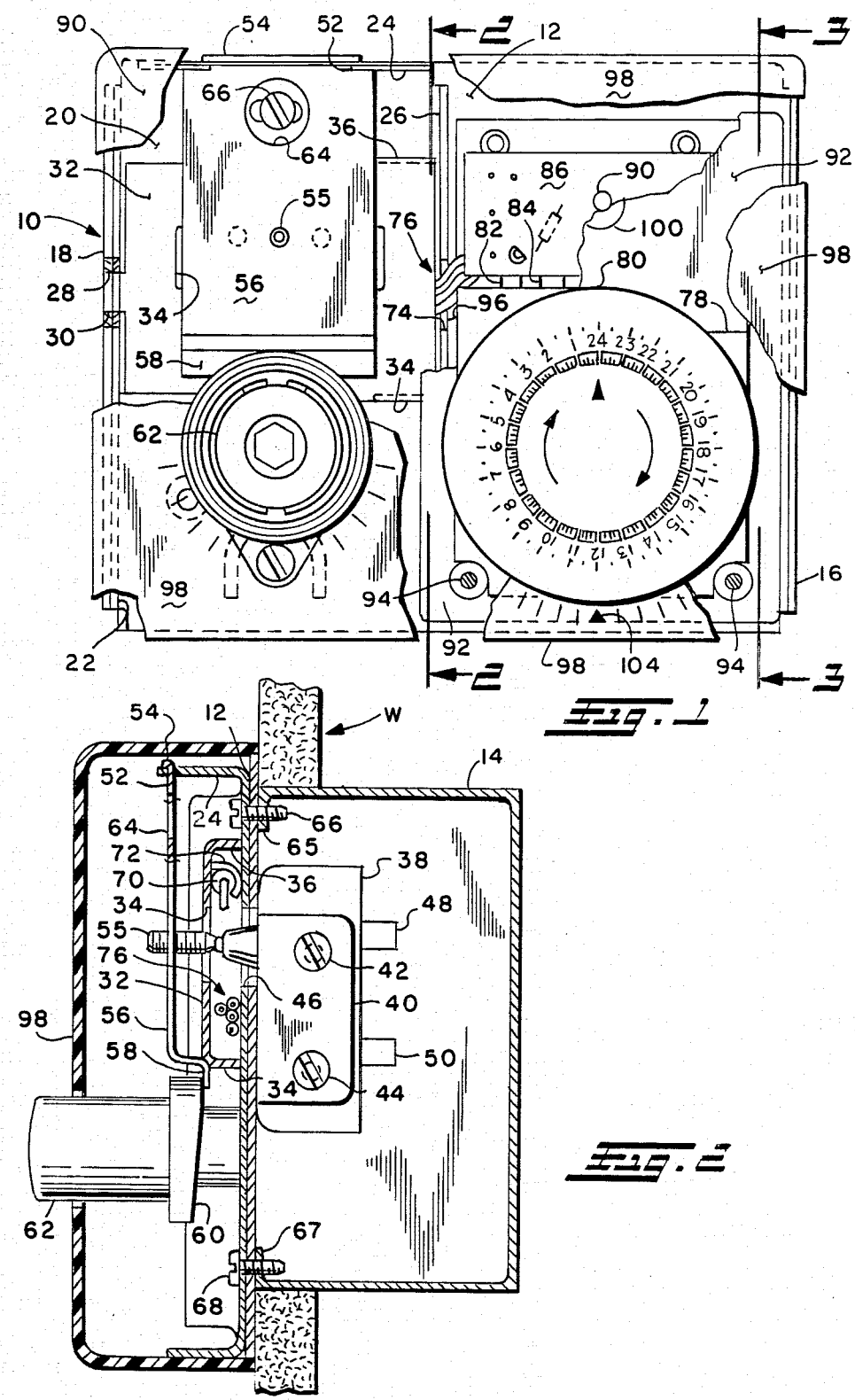

LINE VOLTAGE SETBACK THERMOSTAT

BACKGROUND OF THE INVENTION

The present invention relates to wall thermostats of the type employed for controlling the service cycling of a heating plant for a building. In particular, the invention relates to thermostats of the type for controlling on-off cycling of electrical heating devices, as for example, resistance heaters.

In providing controls for buildings having electrical heating systems, it is desirable to provide a control or thermostat capable of switching load current at line voltage for cycling the heating system.

A controller or thermostat which is capable of performing a load current switching function at line voltage, eliminates the need for costly relay, transformer and the associated extra wiring required in the building for central control.

In addition, the use of a line voltage thermostat facilitates heat regulation by permitting individual thermostat control of separate heaters for each room or zone of the building.

In recent times there has developed an interest in thermostats or controllers for heating systems which can perform an automatic function at a preselected desired time of day for cycling the heating system to operate in a manner so as to maintain the building at a desired temperature less than the normal temperature when the building is occupied. Thermostats or controllers which perform this function are known as "setback" thermostats and employ a timing or clock mechanism which may be set by the user to operate in a setback mode during the desired times when the building will be unoccupied.

Setback thermostats are popular in newly constructed commercial and residential buildings; and, provision is generally made for such type thermostats when the heating system controls are installed and wired into the newly constructed building. However, where it is desired to provide such a setback function for an existing thermostat in an older buildings, problems have arisen. Typically, thermostats in older buildings are wired onto a single width outlet box. This was generally because the control operated on low e.g. 23 volts and was simple, consisting only of a bi-metal actuated switching mechanism and did not employ any clock mechanism requiring additional support wiring space in the outlet box.

Where it has been desired to add or retrofit a setback type thermostat for an existing line voltage thermostat installation, it has been found difficult to provide a way of mounting the thermostat and clocking mechanism onto a single width electrical outlet box as is commonly found in older line voltage thermostat installations.

In buildings having plaster or plaster board walls, building and fire safety codes require that any line voltage wiring extending on the external surface of the wall be encased in metal and have a metal protector plate between the wiring and the surface of the plaster or plaster board. Further, it is usually required by building and fire safety codes to have all line voltage switching mechanisms on the surface of the wall completely encased in metal such that in the event of a short in the switching mechanism, molten metal will not spatter on any material other than metal. Further, it is required by building and safety codes that all line voltage wiring on the surface of a wall be permanently encased in such a manner that users cannot readily access the wiring by simply removing the outer bezel or casing for the thermostat.

Thus, it has long been desired to find a way or means of providing a line voltage setback thermostat that can be retrofitted to existing thermostat installations on a single width electrical outlet box. It has further been desired to provide a line voltage setback thermostat which may be retrofitted to a single width flush mounted or released wall outlet box and one which minimizes the hazards of fire in the event of electrical shorting and also electric shock in the event of removal of the bezel or cover.

SUMMARY OF THE INVENTION

The present invention provides a solution to the above-described problem by providing a line voltage setback thermostat which may be retrofitted onto a single width electrical wall outlet box. The invention provides ease of installation and simplicity yet one which will meet the requirements of building and fire safety codes for minimzing the hazard of fire in the event of short circuiting and electric shock from contact with line voltage wearing. The present invention provides a line voltage setback thermostat with a timer mechanism and heater for altering the response of the thermostat. All components are mounted on one side of a plate which mounts over the single width outlet box; and, the remainder of the plate extends laterally beyond the box along the surface of the wall.

The present invention employs a resistance heater which is energized by a timing mechanism to raise the temperature of the thermostatic element above ambient so as to prevent energization of the load line until the temperature of the room falls below the normally desired temperature by a predetermined differential. The thermostatic element comprises a bi-metal, and the line voltage load current switching mechanism is mounted on a portion of the metal plate which extends over the single width wall outlet box; and, the switching mechanism is recessed and extends into the outlet box. A metal cover is provided over the switching mechanism and heating means and wiring thereto. The timing mechanism is mounted on the adjacent portion of the plate which extends laterally beyond the outlet box and along the surface of the wall. The timing mechanism and the associated wiring between the timing mechanism and the heating means has a plastic cover which overlaps and retains the metal cover onto the mounting plate. The plastic cover can only be removed by removing the entire mounting plate from the single width electrical outlet box to which it is attached. A neon warning light is provided to indicate when the timing mechanism has energized the heating means for operating the thermostat in the setback mode. An outer cover is provided over the entire assembly and has the scales for indicating the setting of the timing mechanism and the adjustment for the thermostat provided on the outer surface thereof. The present invention thus provides a simple and low cost setback thermostat for line voltage operation which may be retrofitted onto an existing installation over a single width electrical wall outlet box without requiring any modification of the outlet box or feld wiring.

BRIEF DESCRIPTION OF THE DRAWINGS

FIG. 1 is a plan view of the thermostat assembly of the present invention with the outer cover or bezel broken away;

FIG. 2 is a section view taken along section-indicating line 2—2 in FIG. 1;

DETAILED DESCRIPTION

Figure 3:
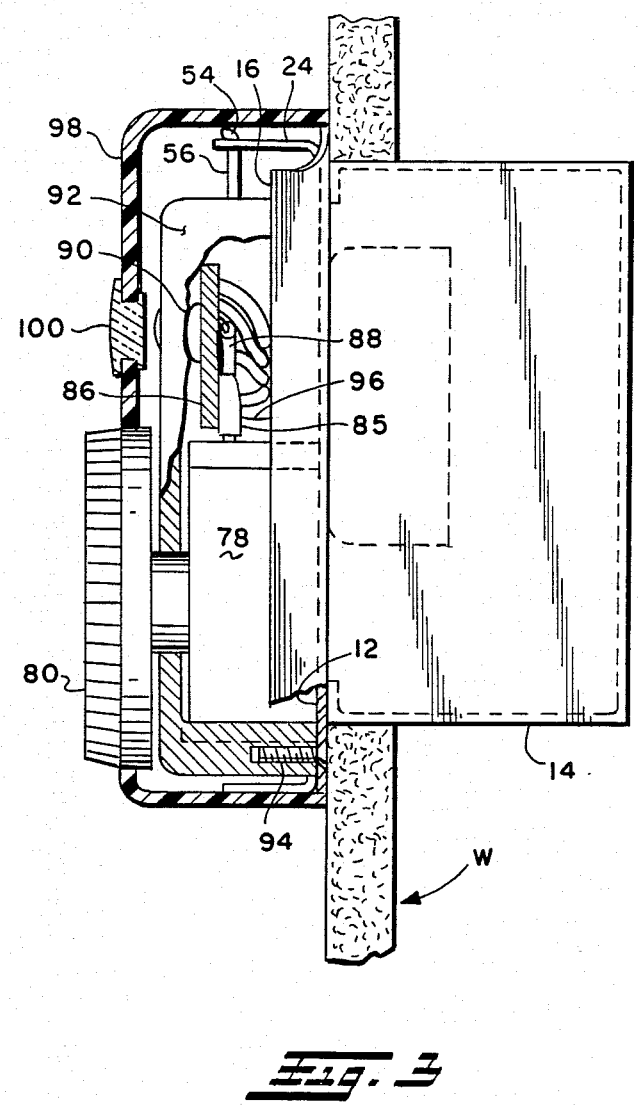
FIG. 3 is a section view taken along section-indicating line 3—3 of FIG. 1; and, FIG. 4 is a wiring schematic for the thermostat assembly of FIG. 1.

Referring now to FIGS. 1-3, the thermostat assembly of the present invention is indicated generally at 10 as having a mounting plate 12 with the lefthand portion thereof in FIG. 1 received over and attached to an existing single width electrical wall outlet box 14, flush mounted in a plaster or plasterboard wall indicated generally at "W". The base plate 12 has upturned flanges 16, 18 provided on opposite vertical edges thereff. A secondary or auxiliary stiffening plate 20 is provided over the lefthand portion of the plate 12; and, the plate 20 also has upturned edges forming flanges 22, 24 and 26 about the opposite sides and along the upper edge thereof. Flanges 18 and 22 have provided therethrough a slot 28 which has received therein a tab 30 provided one edge of a metal cover 32 which has a pair of downturned flanges 34, 36 (see FIG. 2) which flanges rest against the surface of the plate 12. A cutout 34 is provided therein for receiving therethrough thermostat adjusting mechanisms as will hereinafter be described in greater detail.

A suitable switching mechanism in the form of a snap-acting switch 38 is mounted to the underside or backside of plate 12 by convenient expedients, as for example, attachment to a tab or flange 40 provided on the plate 12. Switching mechanism 38 is fastened thereto by convenient fasteners such as screws 42, 44. The switch 38 is positioned such that the actuator therefor extends through a cut-out 46 (see FIG. 2) provided in the plate 12 and auxiliary plate 20. The preferably snap-acting switching mechanism 38 is thus received in the box 14 and may be attached to the existing line voltage and load line wiring in the box 14 by attachment to the terminals 48, 50, provided on the switch 38.

The flange 24 of the auxiliary plate 20 has a slot 52 provided therein which has received therethrough an upturned tab 54 provided on a bi-metal thermally responsive element 56. A suitable adjustment/actuator screw provided is provided on element 56 which is adapted for contacting the actuator of the switch 38. The lower end of the bi-metal 56 has a downwardly offset flange 58 provided thereon which is in contact with a helical cam surface 60 provided on a rotatable adjustment knob 62, which is rotatably mounted on the deck plate 12 by any convenient manner.

It will be understood by those skilled in the art, that although a single switching mechanism has been shown in the illustrated embodiments, that dual switches may also be employed for switching both sides of the load line. In which event, a pair of adjustment screws would be provided through the bi-metal element as shown in dashed outline on either side of the screw 55.

The bi-metal element 56 has a clearance hole 64 provided therein for access to a mounting screw 66 for attaching the deck plate to the tab 65 on the upper edge outlet box; and, a similar attachment screw is provided through a hole in the lower portion of auxiliary plate 20 and deck plate 12 for attachment to the attachment tab 67 provided on lower edge of the box 14.

Referring to FIG. 2, a suitable heating means in the form of a setback resistor 70 is attached to the undersurface of the cover 32 by any suitable expedient as for example, a punched metal tab 72 bent around the resistor. Electrical leads are attached to the resistor and pass under the righthand end of the plate 32, and through a cut-out 74 provided in flange 26 of auxiliary plate 20 as shown in FIG. 1. Although not shown for clarity of illustration, it will be understood that any wiring between the switching mechanism 38 and the components on the outer surface of the deck plate 12 passes through the cutout 46 in the deck plate in the auxiliary plate 20. The wiring between the switching mechanism 38 and resistor 70 and the components of the righthand portion of deck plate 12 is shown generally at 76 in FIG. 2.

Referrng now to FIGS. 1 and 3, a suitable timer or clock mechanism is mounted directly to the righthand portion of deck plate 12 and has a dial or knob 80 extending outwardly therefrom for enabling the user to set the desired time for setback to occur. The timer has a plurality of four connecting terminals 82, 84, 83, 85, two of which are illustrated in FIG. 1 at 82 and 84, provided on the upper edge thereof. The timer includes internally therein an electrical switch (not shown in FIG. 1) which is activated by the timer and which also has a pair of electrical terminals 83, 85 extending from the upper surface of the timer 78, which terminals are omitted in FIG. 1 for clarity.

A printed circuit board 86 is provided and has corresponding mating terminals which connect with the timer terminals 82, 84, 83, 85 for interconnecting the printed circuit board electrically to the timer and simultaneously providing a means of mounting the printed circuit board onto the assembly.

Referring to FIG. 3, the printed circuit board 86 has mounted on the underside thereof, a resistor 88 and on the outer surface thereof, a neon lamp 90 which is series connected to suitable current limiting resistor 88 for enabling line voltage operation of the lamp 90.

Referring to FIGS. 1 and 3, a suitable electrically insulating and heat resistant plastic cover 90 is provided over the components on the righthand portion of deck plate 12. The plastic cover 92 is secured to the deck plate 12 by suitable fasteners such as shown typically by screw 94 which is attached to a hole in the deck plate from the back, or blind side, of the plate 12. This manner of installation prevents removal of the plastic cover 92 by the user without first removing the entire deck plate from the electrical box.

With reference to FIG. 3, the electrical wiring from the printed circuit board 86 passes through a suitable slot or cutout 96 provided in the lefthand edge of the plastic cover 92. The plastic cover 92 has an edge portion 94 thereof on the lefthand edge as shown in FIG. 1, which portion 94 extends marginally over the edge of the metal cover 36 and retains the cover 36 onto the deck plate and also provides complete coverage of the wiring extending between the lefthand and righthand sections of deck plate 12. Thus, the user cannot remove either the plastic cover 92 or the metal cover 32 without first removing entire deck plate from the electrical outlet to obtain access to the The plastic cover 92 has a suitable sight-glass or lens 96 provided therethrough immediately adjacent the lamp 90 for providing visual observation of the lamp condition.

An outer cover 98 is provided of suitable plastic material and the cover 98 provides a front face or bezel for the complete assembly. The bezel has a lens or sightglass 100 provided therethrough above lens 96 to permit the user to view the condition of lamp 90 from the exterior of the assembly.

Figure 4:
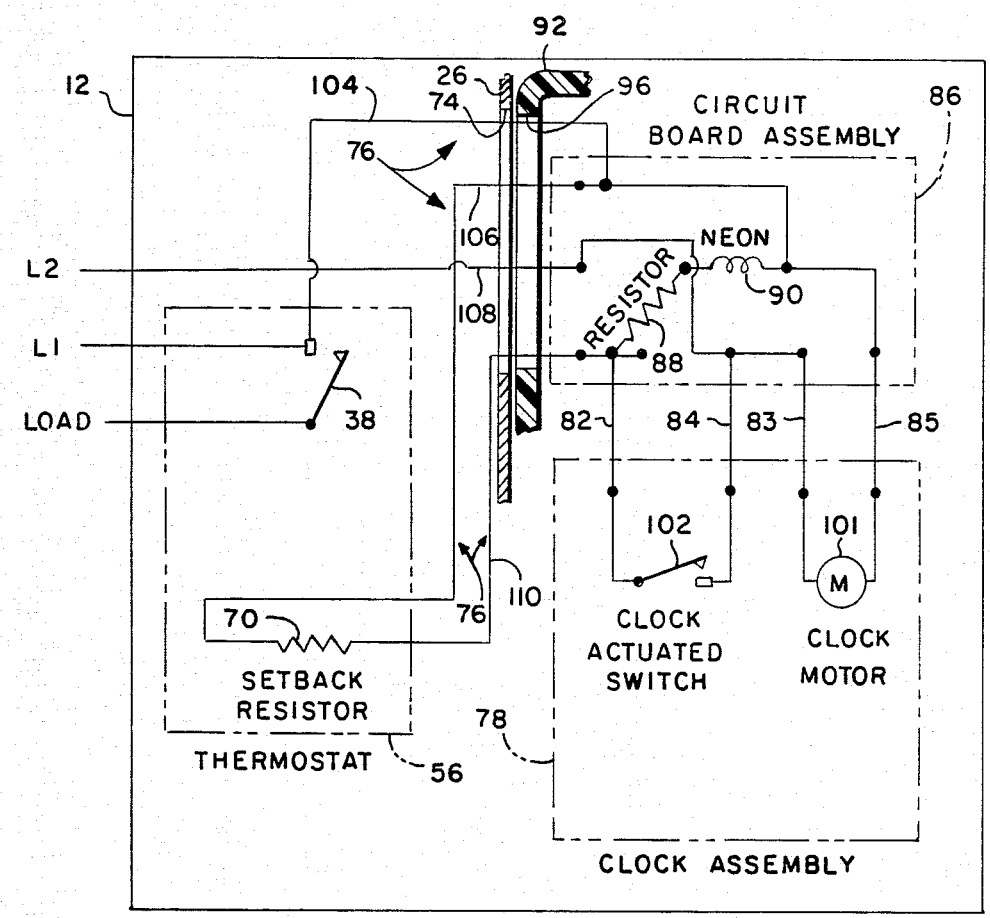

Referring now to FIG. 4, the clock motor is shown in the timer housing 78 and has associated therewith a switch 102 for energizing the heater means comprising resistor 70. The timer has four lead terminals, two of which 82, 84, are illustrated in FIG. 1, and additional terminals 83, 85 shown in FIG. 4 which all interconnect to the printed circuit board 86. The interconnection is shown typically for terminal 85 in FIG. 3. Four electrical lead wires 104, 106, 108 and 110 are the leads collectively referred to generally by numeral 76 in FIG. 2; and, these leads respectively connect the $L_1$ side of the line, the resistor 70, the line $L_2$ and the clock actuated switch 102 to the resistor. All four leads pass through cutout 96 in plastic cover 92 and cutout 74 in the upturned flange of 26 of the auxiliary plate 20. The four leads 104, 106, 108 and 110 pass under the metal cover 32 for connection of leads 106, 110 to the setback resistor 70 and lead 104 the load current carrying line switch 38. Lead 108 passes through the cutout in deck plate 12 for connection directly to the line side $L_2$ in the box 14.

In operation, the user rotates knob 62 to adjust the desired temperature setting of the bi-metal member 56 for normal operation of the thermostat during periods of building or room occupancy. The user rotates knob 80 to set the timer mechanism at the desired time of day for energization of the setback resistor 70 by setting the desired time of day on the face of the knob 80 adjacent the index mark 112 provided on the face of the bezel.

From the foregoing description, it will be seen that the present thermostat assembly provides a unique and novel construction for a line voltage setback thermostat which may be retrofitted to an existing installation for a line voltage thermostat mounted over a single width electrical wall outlet box. The thermostat assembly of the present invention provides a metal deck plate between the wall surface and all line voltage surface components and a metal cover over the load current line voltage switch mechanism for minimizing the hazards of molten metal splatter in the event of a short in the switching mechanism. The invention also employs a plastic cover formed of flame resistant material over the line voltage timer mechanism. The plastic cover overlaps the metal cover to secure the metal cover to the deck plate and also provide complete covering of any surface wiring on tte deck plate. The plastic cover is retained to the deck plate by blind fasteners which require the user to remove the entire deck plate from the wall outlet box in order to access the blind fasteners in the portion of the deck plate which extends laterally over the surface of the wall. The present invention thus provides a unique and novel retrofitable line voltage setback thermostat which attaches over a single width electrical wall outlet box without the need for modification of the box installation or existing feed wires and thereby provides a convenient and economical installation.

Although the invention has hereinabove been described with respect to the illustrated embodiments, it will be understood that the invention is capable of variation and modification and is limited only by the scope of the following claims.

We claim:

1. A line-voltage set-back thermostat for mounting over a single width flush-mounted electrical wall outlet box, said thermostat comprising:
   (a) a mounting plate means having a first portion having a cut-out therethrough and adapted for mounting on said single width outlet box and a second portion adapted to extend beyond said box and overlie the surface of the wall;
   (b) switching means operable for switching load current at said line voltage and mounted on the back side of said plate first portion; for recessed mounting in said box;
   (c) thermally responsive means mounted on said plate first portion and including actuator means extending through said cut-out, said thermally responsive means operative for effecting actuation and deactuation of said switch means in response to ambient temperature changes;
   (d) heater means mounted adjacent said thermally responsive means and operative upon line voltage energization to effect heating of said thermally responsive means above ambient temperature (setback);
   (e) line voltage operated timing means mounted on said second portion of said mounting plate and operative to energize and denergize said heater means for a user selected setback of said thermally responsive means;
   (f) electrical lead means interconnecting said timing means and said heater means;
   (g) a metal shroud disposed over at least part of said first portion of said plate, said cut-out and said heater means, said cover extending to the margin of said first portion adjacent said second portion and covering said lead means along said first portion;
   (h) a cover formed of electrical insulating and flame resistant material covering said timing means and said electrical lead means over said second portion of said plate, said cover extending to the margins of said second plate portion for preventing exposure of said lead means;
   (i) first and second knob means for user adjustment of said timing means and said thermally responsive means; and
   (j) bezel means for presenting a decorative cover to said assembly, said bezel means having said first and second brush means extending therethrough and providing adjustment scale means therefor.

2. The thermostat defined in claims one, wherein, said cover overlaps the adjacent marginal portions of said shroud and retains said shroud on said plate.

3. The thermostat defined in claim one, wherein said cover overlaps the adjacent margin of said shroud and retains said shroud to said plate.

4. The thermostat defined in claim one, further comprising indicator means, visible through said bezel means and operative upon energization of said heater means to indicate said thermostat is in the set-back mode.

5. A iine-voltage set-back thermostat for mounting over a single width flush-mounted electrical wall outlet box, said thermostat comprising:
   (a) a mounting plate formed of metal having a first portion with a cut-out therein and adapted for mounting on said single width outlet box and a second portion adapted to extend beyond said box and along the surface of the wall;

(b) switching means operable for switching load current at said line voltage and having terminals thereon adapted for connection to the load line, mounted on said plate first portion and extending into said outlet box;

(c) thermally responsive means mounted on said plate first portion and operative through said cut-out to actuate and deactuate said switching means in response to changes in ambient temperature;

(d) heating means disposed over said plate first portion adjacent said thermally responsive means, said heating means operative upon energization to effect heating of said thermally responsive means above ambient temperature (set-back);

(e) timing means mounted on said second portion of said mounting plate and operative, upon connection to said line voltage, to selectively energize and de-energize said heating means for user selected timed set-back of said thermostat;

(f) electrical lead means series connecting said timing means and said heating means and extending through said cut-out into said box for connection to said line voltage source;

(g) first cover means formed of metal and disposed over said heater means, said switching means and said lead means;

(h) second cover means formed of electrical insulating and flame resistant material disposed on said plate second portion and extending over said timing means, and said lead means, said second cover means co-operating with said first cover to prevent exposure of said lead means between said first and second plate portions;

(i) first knob means operable upon user movement to adjust the said thermally responsive means for user selection of the temperature at which said switching means is actuated;

(j) second knob means operable upon user movement to select the time of day at which said set-back is effected; and, (k) bezel means providing user readable adjustment scales for said first and second knob means.

6. The thermostat defined in claim 5, wherein said second cover means is mounted on said second plate portion so as to overlap the margins of said first cover means and said mounting is operative to prevent removal of said first and second cover means from the exposed, or front, face of said plate.

7. The thermostat defined in claim 5, further comprising lamp means operative to provide visible indication on said bezel means when said heating means is energized.

* * * * *